United States Patent

Adams et al.

[15] 3,650,291

[45] Mar. 21, 1972

[54] COMBINATION RELIEF AND SHUTTLE VALVE

[72] Inventors: Cecil E. Adams; Leo H. Dillon, both of Columbus, Ohio

[73] Assignee: Abex Corporation, New York, N.Y.

[22] Filed: Dec. 9, 1970

[21] Appl. No.: 96,506

Related U.S. Application Data

[62] Division of Ser. No. 863,908, Oct. 6, 1969, Pat. No. 3,583,157.

[52] U.S. Cl. .............................. 137/491, 137/493, 137/87
[51] Int. Cl. ................................. F16k 17/22, F15b 15/18
[58] Field of Search ................ 137/87, 95, 116, 116.3, 490, 137/491, 493, 489

[56] References Cited

UNITED STATES PATENTS

| | | |
|---|---|---|
| 3,090,398 | 5/1963 | Adams ............................ 137/491 |
| 2,870,781 | 1/1959 | Tennis ............................ 137/490 |
| 3,373,763 | 3/1968 | Smilges .......................... 137/491 |
| 3,401,605 | 9/1968 | Born .............................. 137/491 |

Primary Examiner—Samuel B. Rothberg
Assistant Examiner—William H. Wright
Attorney—Wood, Herron & Evans

[57] ABSTRACT

A closed loop hydrostatic transmission for transmitting rotary power from a reversible fluid pump to a reversible fluid motor. The transmission includes a novel combination dual relief and shuttle valve operable to relieve excessive pressure from whichever is the higher pressure of two main lines of the loop circuit and to connect whichever is the lower pressure or pump inlet line of the two main lines to a replenishment oil circuit. Two different hydrostatic transmissions are disclosed; one a full boost transmission in which all of the flow from a booster pump is inserted into the closed loop circuit and the other a partial boost transmission in which only makeup oil required for replenishment of oil leakage is inserted into the closed loop circuit.

8 Claims, 2 Drawing Figures

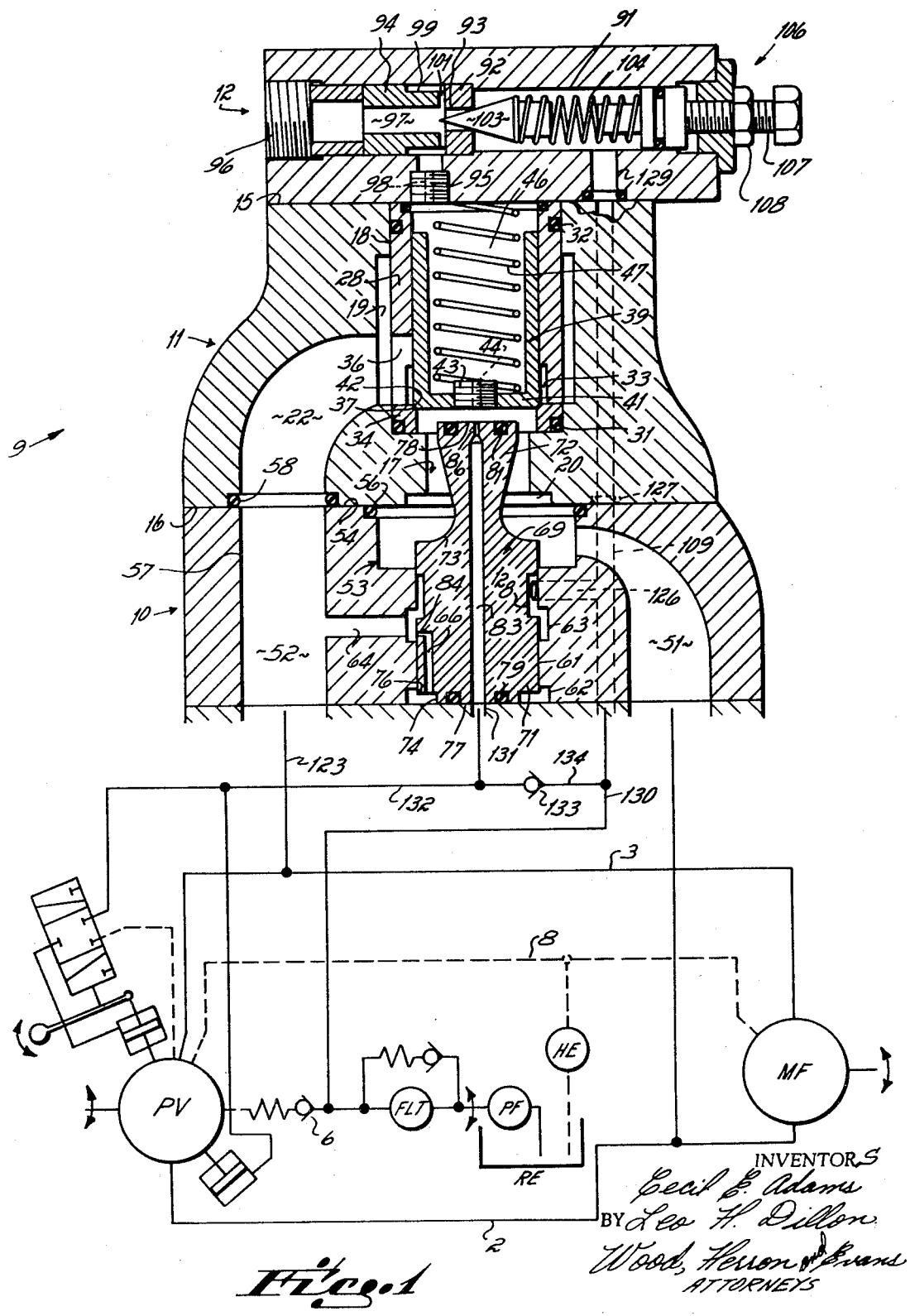

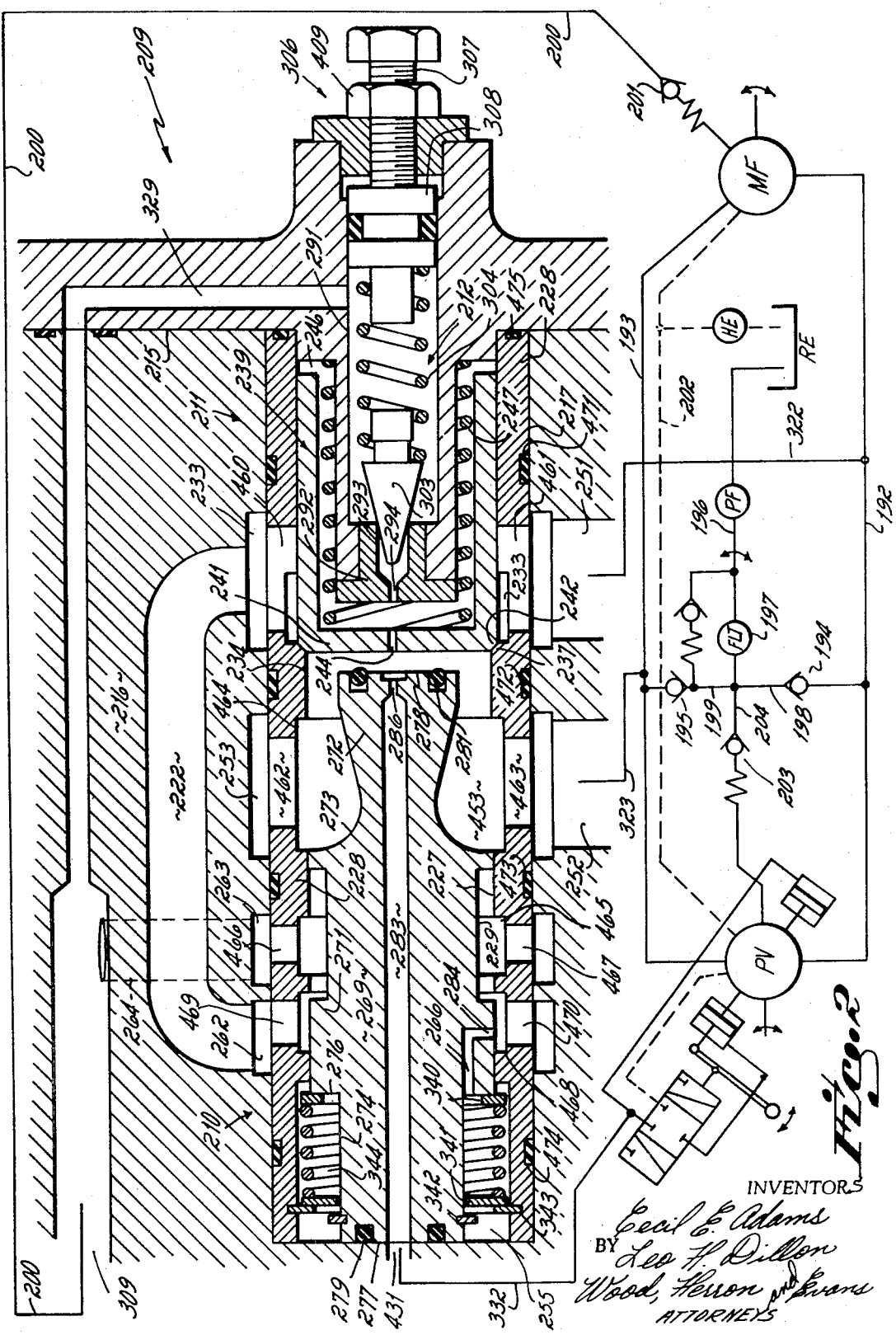

3,650,291

COMBINATION RELIEF AND SHUTTLE VALVE

This application is a division of application Ser. No. 863,908 filed Oct. 6, 1969, now U.S. Patent No. 3,583,157 and assigned to the assignee of this application.

This invention relates to a combination dual relief and shuttle valve which is particularly applicable to hydrostatic drives or hydrostatic transmissions. More particularly, it relates to a combination relief and shuttle valve applicable to hydraulic drives in which a positive displacement pump and motor transfer rotary power in a closed circuit by means of fluid under pressure.

In closed circuit hydrostatic drives or transmissions, the pump and motor are connected inlet to outlet to form a closed "loop" for oil flow. There are no flow control or directional valves. To vary output speed, either the pump or motor or both must be of variable displacement. Direction of rotation of the output is changed by using an over-center variable displacement pump. To control pressure in the closed circuit and prevent it from building up excessively in the event of excessive torque at the output, as for example, if the output shaft is physically stopped, the circuit requires a relief valve. Additionally, it requires a replenishment network to replenish the circuit with oil which is lost to leakage in the pump and motor. In a reversible closed circuit drive, the relief valve must be capable of relieving excessive pressure in whichever line is the pump outlet or high pressure line and the replenishment circuit must be capable of supplying makeup oil to either line depending upon which is the pump inlet side or low pressure side of the loop.

Hydrostatic drives or transmissions have numerous advantages over more conventional and widely used gear type drives or transmissions. However, in some cases, their cost, size, complex circuits and numerous components have limited their commercial use.

It has therefore been a primary objective of this invention to reduce the total cost of a hydrostatic drive or transmission by reducing the number and complexity of the component parts of the system by reducing or eliminating several valves from the system.

Another objective of this invention has been to reduce the weight and size of a hydrostatic transmission in relation to the power transmitted by the transmission.

Still another objective of this invention has been to provide a unitary dual relief and shuttle valve operable in closed circuit hydrostatic transmissions to relieve excessive pressure in either line of a closed loop circuit depending upon which line is the higher or pump inlet line and to simultaneously and automatically direct replenishment oil to whichever side of the loop is the low pressure or pump inlet side.

Still another objective of this invention has been to provide a new and improved dual relief valve operable to relieve excessive pressure in either of two lines depending upon which is the higher pressure of the two.

These objectives have been accomplished and this invention is partially predicated upon the development of a combination dual relief and shuttle valve. When used in a reversible closed loop hydraulic circuit this combination relief and shuttle valve functions to relieve excessive pressure in the pump outlet side of the circuit irrespective of which side that may be and to supply replenishment oil from a booster pump to whichever side of the loop or closed circuit is the oil replenishment or low pressure side.

Briefly, the combination dual relief and shuttle valve comprises a main pressure relief valve spool controlled by a pilot valve. This pilot valve is operable to open at a predetermined pressure to limit the maximum valve closing pressure of fluid in a fluid retaining or control pressure chamber on one side of the pressure relief valve spool. A movable poppet or piston forms a valve for connecting the control pressure chamber alternately with whichever of two ports is at the higher or greater pressure. This same poppet also is operative to connect whichever of the two ports is at the low pressure to the fluid replenishment network through a third port of the valve. In the preferred embodiment of the invention, a fourth port of the valve is connected to a servo control system of the pump. The valve poppet is also operative to connect this fourth port to whichever of the first two ports is at the higher pressure so that the high pressure of the system is always available to move the pump displacement control element.

The primary advantage of the combination dual relief and shuttle valve heretofore described is that it substantially reduces the cost of a closed circuit hydrostatic transmission by replacing numerous relief valves, shuttle valves, and check valves with a single combination dual relief and shuttle valve. By eliminating numerous parts, or substituting a single valve for multiple valves, the cost of the complete transmission is appreciably reduced. The size and weight ratio to power transmitted is substantially improved and its reliability is increased because of the fewer components.

These and other objects and advantages of the invention will be more readily apparent from the following description of the drawings in which:

FIG. 1 is a diagrammatic illustration of a hydrostatic transmission incorporating the invention of this application and showing in vertical cross section one preferred embodiment of a combination dual pressure relief and shuttle valve, and FIG. 2 is a diagrammatic illustration of a second modification of a hydrostatic transmission incorporating the invention of this application and illustrating in vertical cross section a second modification of a combination dual pressure relief and shuttle valve.

Referring first to FIG. 1, there is illustrated a closed loop hydraulic transmission for transmitting rotary power from a servo controlled pump PV to a motor MF. The pump PV and motor MF are connected in a closed loop by the fluid lines 2 and 3. In one preferred embodiment, the pump PV is a reversible variable volume pump and the motor MF is a fixed displacement reversible fluid motor. The pump could just as well for purposes of this invention be a fixed displacement pump and the motor a variable volume motor.

An oil replenishment system supplies makeup or replenishment oil from a reservoir RE to whichever of the lines 2 or 3 is the low pressure or pump inlet line. This replenishment network consists of a booster pump PF operable to supply booster pump fluid to the dual relief and shuttle valve 9 which in turn directs the booster pump fluid to the low pressure one of the two lines 2 and 3 as explained more fully hereinafter. Excess oil not required for makeup of oil losses or leakage in the pump or motor is forced through a low pressure check valve 6 into the case of the pump PV. The cases of both the pump PV and the motor MF are connected by a line 8 to the reservoir RE through a heat exchanger or oil cooler HE. The pump PV thus acts as a heat exchanger to cool the oil within the closed loop circuit.

The dual relief and shuttle valve 9 is comprised of three main components or sections, namely, a lower body section 10, a middle body section 11, and a pilot or control valve cap section 12.

The lower body 10 includes the fluid ports or connections by which the valve is connected to fluid passageways or conduits, and a shuttle valve mechanism which is used to apply pressure from whichever port is acting as the high pressure port to operate the main pressure relief valve, and to connect the low pressure port to the oil replenishment system. The middle body section 11 contains the main relief valve forming elements and includes fluid passageways which communicate through the main valve between the ports of the lower body. The cap structure 12 includes a pilot valve for directly controlling the opening and closing of the main valve elements of the middle body 11.

The middle body 11 has a flat upper surface 15 and a flat lower surface 16 which is parallel to the surface 15. A stepped central vertical bore 17 is formed in middle body 11 between the surfaces 15 and 16 thereof. The upper portion of bore 17 is enlarged, as at 18, and is provided with an annular groove 19. The lower end of bore 17 is enlarged as at 20, adjacent lower surface 16. A downwardly curving fluid passageway 22 communicates between groove 19 of bore 17 and the lower surface 16 of the middle body 11.

A cylindrical sleeve 28 is snugly fitted in portion 18 of bore 17, closing groove 19, and its lower end is seated against an annular shoulder which demarcates portion 18 in bore 17. Suitable fluid seals 31 and 32 such as the O-rings shown are provided at the lower and upper ends respectively of sleeve 28 whereby the sleeve is sealed to bore 18. An annular groove 33 is formed around the interior surface of sleeve 28 adjacent the lower end 34 thereof, and a plurality of ports 36 provide fluid communication through the sleeve 28 between groove 33 of the sleeve and groove 19 formed in bore portion 18. An annular, beveled edge 37 is defined between groove 33 and the lower end 34 of the sleeve 28, and this edge 37 comprises one of the surfaces which coact to form the main valve, as will be explained.

A cylindrical, hollow, cup-shaped poppet or movable valve spool 39 is slidably received in sleeve 28. At its lower end 41 the spool 39 is provided with a conical or beveled external surface 42 which mates with and cooperates with edge 37 of sleeve 28 to form the main valve for controlling pressure. A plug 43 is threaded into an opening in the lower end 41 of spool 39, and this plug 43 has a restricted opening or orifice 44 through it. Opening 44 provides restricted fluid communication through the lower end surface 41 of spool 39 between bore 17 and the fluid retaining or control pressure chamber 46 which is defined on the interior of and above spool 39.

A compression spring 47 in chamber 46 bears against the lower end 41 of spool 39 and tends to hold the spool 39 downwardly in sleeve 28. In the relief valve shown the cross-sectional area of spool 39 is preferably slightly greater, e.g., about 3 percent, than the internal area of the spool surface 41 located within the lower end 34 of sleeve 28.

The lower body 10 has a port 51 formed on one side thereof and a port 52 formed on the opposite side thereof. Each of these ports 51 and 52 is provided with suitable connection to fluid piping. The port 51 communicates with a shallow central vertical bore 53 which is formed adjacent the upper surface 54 of the lower body 10. Bore 53 is centered axially with respect to bore 17 in the middle body section 11, and the bores 17 and 53 are in fluid communication. An O-ring 56 is provided around the two bores 17 and 53 to provide a fluid seal between the adjacent surfaces 16 and 54.

Port 52 of lower body 10 intersects a vertical bore 57 which communicates with the downwardly curving passageway 22 in the middle body 11. An O-ring 58 is provided around the lower end of passageway 22 between surfaces 16 and 54. A bore 61 which is of smaller diameter than bore 53 extends downwardly from bore 53, and this bore 61 is coaxial with the spool 39. Bore 61 is enlarged at its lower end, as at 62. Bore 61 is provided with an annular groove 63, and communicates with vertical bore 52 by means of bore 64. A horizontal bore 126 communicates between bore 61 and vertical bore 109. An O-ring 127 is provided around bore 109 to provide a seal between the adjacent surfaces 16 and 54.

A movable piston or poppet member generally designated by 69 is slidably received in bore 61. This piston or poppet member 69 has a cylindrical lower portion 71 which forms a movable fluid seal with bore 61 in which it slides. The poppet 69 also has a tapered or inverted conical upper portion 72 which rounds outwardly as at 73 where the portion 72 joins the lower portion 71 of poppet 69. The flaired surface 73 reduces turbulence in either direction of flow between ports 51 and 52. The cross-sectional area of poppet 69 is preferably slightly less, e.g., by about 3 percent, than the internal area at the lower end 34 of sleeve 28, and is thus preferably about 6 percent smaller than the area of spool 39. A small diameter neck portion 74 is formed at the lower end of poppet 69, and a horizontal annular area 76 is defined between neck 74 and portion 71 of poppet 69. Both the lower end 77 and the upper end 78 of poppet 69 are flat and are fitted with identical O-rings 79 and 81 respectively. When the poppet 69 is forced downwardly in bore 61, the O-ring 79 in the lower end 77 of the poppet forms a valve or fluid seal with the bottom surface of bore 62, and when the poppet 69 is forced upwardly in bore 61, the O-ring 81 in the upper end 78 of the poppet 69 forms a valve or fluid seal with the lower end 41 of the spool 39.

An axial bore 83 extends through poppet 69 between the ends 77 and 78 thereof, and is provided with a restricted opening or orifice 86 formed in it. The O-rings 79 and 81 encircle the ends of bore 83. As will be explained, fluid pressure at port 52 is supplied to the lower end of poppet 69 and urges the poppet upwardly into facial engagement with the lower end 41 of spool 39, so that a fluid passageway is provided from the lower end of poppet 69 and port 52 into the control pressure chamber 46 above spool 39 through the passageways 83 and 44 which, under these circumstances, are sealingly connected end to end by the valve action of O-ring 81 and the bottom of spool 39. A vertical bore 66 communicates annular groove 63 and the lower portion 62 of bore 61, by means of a restricted opening or orifice 84. An annular groove 128 alternately connects annular groove 63 or bore 53 to bore 126 depending on the operating position of movable piston or poppet 69.

The cap structure 12 which is mounted atop the upper surface 15 of middle body 11 contains a suitable pilot or control valve mechanism which directly controls the opening of the main valve 37, 42, and whereby the pressure at which the main valve opens can be adjusted. As herein shown, the cap 12 has a horizontal bore 91 formed through it, and a fixed pilot valve seat element 92 is seated against a shoulder in the bore 91. Pilot valve seat element 92 has an axial bore 93. A sleeve 94 in bore 91 bears against the fixed valve element 92 and holds it against the shoulder in bore 91, and this sleeve 94 is in turn held in place by a plug 96 which closes the left end of bore 91. The internal chamber 97 within sleeve 94 thus communicates with the bore 93 in valve seat element 92.

Fluid communication between the control pressure chamber 46 within spool 39 and the chamber 97 in sleeve 94 of the pilot valve is established through a plug 95 having an opening or orifice 98 through it, an external groove or neck 99 around the sleeve 94, and ports 101 formed through sleeve 94. A cone-shaped movable valve element 103 cooperates with the seat 92 to form a pilot valve which controls the maximum pressure in control pressure chamber 46. A compression spring 104 urges the movable element 103 into closing position with respect to the fixed valve element 92. The compression of spring 104 is adjusted by means of an adjusting mechanism which is designated generally by 106. The adjusting mechanism 106 includes an adjusting screw 107 the inner end of which bears against a plug slidable in the bore 91 which carries an O-ring seal and which abuts the spring 104 and thereby determines the compression of that spring. A lock nut 108 secures screw 107 axially with respect to bore 91 in the cap structure 12. A tank port 129 communicates with the bore 91 on the right or downstream side of valve element 103 and vertical bore 109.

Assuming first that pressure is supplied to port 51 and that port 52 is at low pressure with respect to port 51, so that port 51 under these circumstances comprises the inlet port, fluid pressure at port 51 is applied to the lower end surface or area 41 of spool 39 through bores 53 and 17. Under static conditions (when the valve 37, 42 is closed), this same fluid pressure is reflected in chamber 46 above spool 39 through the restricted opening or orifice 44 in the lower end of spool 39. The pressure of fluid beneath spool 39 and at port 51 acts upwardly on an area equal to the cross-sectional internal area within the lower end 34 of the sleeve 28, whereas the pressure above the spool 39 in chamber 46 acts downwardly on a slightly larger area which is equal to the cross-sectional area of spool 39. As previously explained, the cross-sectional area of the spool 39 is slightly greater, preferably about 3 percent, than the area of the lower end 34 of the sleeve 28. Therefore, under these circumstances, the downward acting fluid force is the greater, and together with the force of spring 47, holds the main valve 37, 42 closed.

The fluid pressure in control pressure chamber 46 is applied to the left end of movable pilot valve element 103 through restricted opening or orifice 98, groove 99, ports 101, chamber 97, and bore 93 in the fixed valve element 92. Spring 104 holds the valve 92, 103 closed until the fluid force tending to open the pilot valve exceeds the force of spring 104.

When the fluid pressure at the inlet 51, as reflected on conical pilot valve element 103, applies a force to the valve element 103 which is greater than the force of spring 104, the pilot valve 92, 103 opens, permitting fluid under pressure in chamber 97 to flow to the tank port 129 thus maintaining the pressure in chamber 46 at that pressure at which valve 92, 103 opens.

If the spring 104 is adjusted to require 3,000 p.s.i. acting on poppet 103, then the pressure in control pressure chamber 46 will never more than slightly exceed 3,000 p.s.i. and this excess will be due solely to the pressure drop across the non-chatter orifice 98. Thus, whenever valve 92, 103 is open there will be a flow of fluid from the port 51 through the orifice 44, chamber 46, orifice 98 and valve 92, 103 to port 129. It will thus be seen that the resulting pressure drop across the orifice 44 will create a pressure differential at opposite ends of the spool 39 with the greater pressure tending to lift the spool 39 thereby opening the valve 37, 42 in proportion to the pressure differential and limiting the pressure in port 51 to a value only slightly higher than that pressure at which valve 92, 103 opens.

As the main valve 37, 42 opens, fluid under pressure at the lower end of spool 39 is released to port 42, which under these circumstances is an outlet port, through groove 33, ports 36, curved passageway 22, and bore 52. The compression of spring 104, which determines the fluid pressure required to open the pilot valve 92, 103, controls the pressure in inlet 51 at which the main valve 37, 42 will open, and as previously explained this operating pressure can be adjusted by means of the adjusting mechanism 106.

When the pressure of fluid at the inlet 51 drops to a value at which the fluid force acting on movable valve element 103 is less than the force of spring 104, the pilot valve 92, 103 will close, thereby preventing flow to tank through port 129, and the fluid pressure in chamber 46 rapidly builds up to a pressure equal to that acting on the lower end of spool 39. The valve closing fluid pressure, together with the mechanical force of the spring 47, then closes the main valve 37, 42.

When the pressure at port 51 is greater than that at port 52, the poppet 69 is held downwardly in bore 61 by the pressure of fluid acting on its upwardly facing surfaces. Under these conditions, where port 52 is the outlet port, the pressure on annular area 76 will be equal to the pressure of fluid at the outlet. Therefore, the larger downwardly acting pressure holds the poppet 69 against the lower end of bore 62, and fluid is prevented from flowing through bore 83 into the bore 62 by the valve means including O-ring 79 which forms a seal at the lower end of the poppet 69. FIG. 1 shows the poppet 69 in this position when pressure at port 51 is greater than that at port 52.

When the poppet valve 69 is in the lower position illustrated in FIG. 1, makeup of replenishment fluid is supplied from the pump PF through line 130, conduits 109 and 126, annular grooves 128 and 63, conduits 64 and 52 and lines 123 to the low pressure or pump inlet line 3. Thus the poppet valve 69 acts as a shuttle valve to connect the oil replenishment line 130 to the low pressure or inlet side of the pump PV. That booster pump fluid not required to make up for oil losses or leakage in the pump PV and motor MF is forced through the spring loaded check valve 6 which serves as a low pressure relief valve to the pump case and subsequently through return line 8 and the heat exchanger or oil cooler HE to the reservoir RE.

Assuming now that the pressure at port 52 is greater than that at port 51, port 52 comprises the inlet port of the valve. Pressure at port 52 is applied through conduit 64 and groove 63, through orifice 84, and bore 66 to the annular area surrounding the O-ring 79 and including the area 76 around the neck 74 at the lower end of poppet 69. Since the pressure at port 51 is relatively low, the pressure on the described annular area lifts the poppet 69 in bore 61 and holds its upper end 78 in facial sealing engagement with lower end 41 of spool 39. The O-ring 81 forms a fluid seal between the upper surface 78 of poppet 69 and the lower end 41 of the spool 39, so that a direct fluid passageway is provided between bore 62 to chamber 46 through bore 83 and restricted opening or orifice 44. Through these connecting passageways pressure in inlet 52 is applied to chamber 46 and pilot valve element 103, and it is this pressure in conjunction with the pressure at port 52 acting on the bottom end of piston 69 which then controls the operation of the pilot valve.

The pressure of fluid in chamber 46 acts downwardly on the cross-sectional area of the spool 39, whereas the pressure of fluid acting upwardly on the lower end of the poppet 69 acts on a cross-sectional area which is preferably about 6% smaller, as previously explained, than the cross-sectional area of spool 39, but this area when added to the 3 percent at the edge 42 leaves a total 3 percent difference in effective hydraulic unbalance on the spool 39, and therefore a net downward force holds the spool 39 downwardly to maintain the valve 37, 42 closed until flow occurs through the pilot valve section 12. (Thus, regardless of whether port 51 or port 52 is the inlet port, hydraulic and spring pressure holds the main valve 37, 42 closed until the pilot valve 92, 103 opens and the force of spring 47 is overcome). The pressure at inlet 52 will be maintained at the value determined by the compression of spring 104, and this pressure will continue to hold the poppet 69 against the spool 39. When the pressure at the inlet 52 drops below the value maintained by spring 104, the pilot valve 92, 103 closes, the pressure in chamber 46 builds up to a value equal to the pressure at port 52 and supplies a force which with the spring 47 then overcomes the upward force applied to the poppet 69, and closes the valve 37, 42. Fluid pressure at the lower end of poppet 69 holds the poppet in contact with the lower end 41 of the spool 39 so long as this pressure is greater than the pressure in port 51.

With the poppet 69 in this raised position, makeup boost pump volume is circulated from line 130, through conduits 109 and 126 and groove 128 to the chamber 53 and subsequently to the low pressure port 51. The line 51 then supplies the makeup fluid to the pump inlet via line 2. Simultaneously, excess fluid from the booster pump is forced through the check valve 6 to the pump PV case and subsequently back through the oil cooler HE to the reservoir RE.

From the foregoing it will be seen that regardless of the direction of fluid flow through the dual relief and shuttle valve, it is the pilot valve 92, 103 which controls the operation of the pressure relief valve 37, 42. In the first circumstance described, however, the pressure applied to the pilot valve is controlled by pressure at inlet 51, whereas in the other situation the pressure at port 52 is applied to the pilot valve to operate it. In effect, the piston or poppet 69, which when the port 52 is the high pressure port is operative in actuating the spool 39, also comprises a valve which connects the appropriate port 51 or 52, whichever is under the greater pressure, to supply the operating pressure to the pilot valve, and the pilot valve is thus operated by whichever pressure at the ports 51, 52 is the greater. Simultaneously the poppet 69 also acts to connect whichever port 51, 52 is the lower pressure port to the replenishment fluid port 109.

In the embodiment of FIG. 1, the pressure relief valve also has a fourth port 131 which is always connected by the poppet 69 to the high pressure port which may be either 51 or 52 of the valve 9. This port 131 opens into and is always in communication with the conduit 83 internally of the poppet 69. In the lowered position of the poppet 69, when the port 51 is connected to the high pressure side of the pump PV, the port 131 is connected to the port 51 through the conduit 83, the orifice 86, and the chambers 17 and 53. In the raised position of poppet 69, the port 52 is the high pressure port and the connection is via conduits 64, 84, 66 and channel 62 to the port 131.

The high pressure port 131 is connected to the servo system via line 132 so that the high pressure may be utilized to actuate the servo motors and position the displacement changing element, such as the hanger (not shown), of the pump PV. In order to enable the hanger or displacement changing element of the pump PV to be moved by the servo system out of a neutral or centered position, in which position there is no flow in either line 2 or 3, the line 132 is connected to the booster pump supply line 130 by a line 134 through a check valve 133. Thus the booster pump flow is available to supply the servo system with fluid under pressure when the pump PV is in a neutral or non-pumping condition.

Referring now to FIG. 2, there is illustrated a second embodiment of a hydrostatic transmission or hydrostatic drive. This modification differs from that of FIG. 1 principally in that it is a full boost transmission, i.e., one in which the entire exhaust flow of the motor is directed to the reservoir through the heat exchanger for maximum cooling. Fresh cooled fluid is then supplied to the pump inlet from the reservoir by the boost pump. The capacity of the boost pump is large enough to supply the full volumetric requirement of the pump inlet. This circuit arrangement supplies the fresh fluid for the pump regardless of amount or direction of pump flow. This arrangement also assures, in the event of an overload that requires the dual relief valve to bypass fluid, that the hot fluid from the relief valve exhaust will be returned to the reservoir through the heat exchanger instead of being recirculated through the pump.

One advantage of this circuit over that disclosed in FIG. 1 is that it effects greater cooling of the oil, or otherwise expressed it maintains the oil of the closed loop circuit at a lower temperature than does the partial boost system of FIG. 1.

The transmission illustrated in FIG. 2 also differs from that of FIG. 1 in that it incorporates a modified dual relief and shuttle valve. Functionally, this valve 209 is similar to that of the modification of FIG. 1. It differs principally in that the shuttle or valve is spring centered and the pilot valve is axially aligned with the relief valve and the shuttle valve. Also, the porting size of the shuttle valve is larger to allow the full exhaust flow of the motor to be bypassed to the reservoir. By having the shuttle spring centered, the fluid motor is prevented from free wheeling in the event the output shaft of the motor is driven by an external load, in which case the motor exhaust is no longer allowed to bypass to the reservoir but is required to be absorbed by the pump inlet port. This assures that the pump displacement still controls the motor speed even when the external load tries to drive the motor faster than the pump discharge would drive it. This requirement does not exist in the circuit described in FIG. 1 since in that circuit fluid was never returned to the reservoir at low pressure and the free wheeling of the motor cannot occur. The in-line construction has the advantage of reducing the overall size of the dual relief and shuttle valve by locating the pilot valve internally of the relief valve. It also has the advantage of being mounted within a cylindrical hole of a housing so that it may be incorporated into and made a unitary part of the housing of a pump or motor. Functionally and aside from the results described resulting from the spring centering of the shuttle feature, the dual relief and shuttle valve of the modification of FIG. 2 is the same as the dual relief and shuttle valve 69 of the modification of FIG. 1.

The hydraulic transmission of FIG. 2 comprises a servo controlled pump PV and a motor MF interconnected in a closed loop circuit by the fluid lines 192 and 193. In this modification, the pump PV is also a reversible variable volume pump and the motor MF is a fixed displacement reversible fluid motor.

An oil replenishment system supplies makeup or replenishment oil from a reservoir RE to whichever of the lines 192 or 193 is the low pressure or pump inlet line. This replenishment network consists of a booster pump PF operable to supply booster pump fluid via line 196 and a filter 197 to the line 192 or 193, whichever is at the lower pressure, through line 198 or 199 and a check valve 194 or 195. High pressure fluid in one of the lines 192 or 193 holds one of the check valves 194, 195 closed so that the complete flow of fluid from the booster pump PF is forced through the other check valve 194 or 105 into the lower pressure one of the two lines without loss of high pressure oil into the boost circuit. Exhaust oil from the motor is passed through the combination relief and shuttle valve 209, along with excess boost pump volume not required by the pump inlet, through a line 200 and a low pressure check valve 201 into the case of the motor MF. The cases of both the pump PV and the motor MF are connected by a line 202 to the reservoir RE through a heat exchanger or oil cooler HE. Thus, this embodiment of the transmission is a full boost system in that it utilizes all of the booster pump fluid in the closed circuit of the transmission and bleeds off the excess booster pump fluid plus the exhaust volume of the motor back to the reservoir RE through the heat exchanger HE. Preferably, a spring loaded safety check valve 203 serving as a low pressure relief valve in line 204 connects the booster pump line 196 to the case of the pump PV so that booster pump flow is allowed to return to the reservoir RE at any time that the shuttle valve should be in a centered or flow blocking position.

The dual relief and shuttle valve 209 is comprised of three main components or sections, namely, an inner or shuttle valve section 210, a central or relief valve section 211, and a pilot or control valve cap section 212. In this embodiment, the pilot valve is positioned coaxially and partially within the relief valve spool so that space is conserved and the complete valve assembly may be located within the housing of a pump or motor.

The inner valve section 210 includes the fluid ports or connections by which the valve is connected to fluid passageways or conduits, and a shuttle valve mechanism which is used to apply pressure from whichever port is acting as the high pressure port to operate the main pressure relief valve, and to connect the low pressure port to the reservoir. The central valve section 211 contains the main relief valve forming elements. The cap structure 212 includes a pilot valve for directly controlling the opening and closing of the main relief valve elements of the middle body 11.

A cylindrical bore 217 is formed in body 216 or case of the pump to accommodate the combination relief and shuttle valve 209. Four ports 251, 252, 431 and 309 intersect and connect with the cylindrical bore 217 of the body 216. Two of these ports 251 and 252 are connected to the lines 192 and 193 respectively by fluid lines 322 and 323. The port 431 is connected by a line 332 to the servo system such that it connects the servo system to the high pressure side of the control valve as explained more fully hereinafter. Port 309 is the exhaust oil bleed off port through which fluid motor exhaust and excess boost oil is forced through line 200 and check valve 201 to the case of the motor MF.

In addition to the four ports in the body 216, there are four longitudinally spaced annular grooves 233, 253, 263 and 262 in the body which intersect the bore 217 and form longitudinally spaced enlargements of it. The annular grooves 233 and 262 are interconnected by a generally C-shaped channel 222 which extends generally longitudinally through the body 216. Port 251 opens into the channel 233 so that the conduit 222 in the body interconnects the groove 262 to the port 251. Groove 263 is connected by a conduit 264 in the body to the port 309. The channel 253 opens into the port 252.

A sleeve 228 fits snugly within the bore 217. This sleeve is ported and channeled so that it cooperates with the channels 233, 253, 263 and 262 of the body and with the relief valve 239 and shuttle valve 269 to achieve the relief and shuttle valve functions. Specifically, sleeve 228 has a pair of opposed transverse apertures 460 and 461 which open into the annular groove 233 on the interior of the bore 217. The apertures 460 and 461 thereby connect the groove 233 and the port 251 through the sleeve 228.

Similarly, the sleeve 228 has an internal annular groove 464 which is connected through a pair of apertures 462 and 463 to the annular groove 253 in the body. The ports or apertures 462 and 463 thereby connect the annular groove 464 in the interior of the sleeve with the port 252.

In the same manner, a third annular groove 465 on the interior of the sleeve is connected through a pair of transverse apertures 466 and 467 to the annular groove 263 in the body and consequently with the port 309 through the conduit 264. A fourth internal groove 468 on the interior of the sleeve is connected by a pair of opposed apertures 469 and 470 with the annular groove 262 and consequently with the conduit 222 and the connected port 251.

To seal the channels or grooves 233, 253, 263 and 262 and prevent fluid leakage between them around the periphery of the sleeve 228, four O-rings 471, 472, 473 and 474 are fitted within grooves in the periphery of the sleeve 228. Additionally one O-ring 475 in the end of the sleeve prevents leakage between the sleeve 228 and the end cap 212.

An annular, beveled edge 237 is defined between groove 233 and a land 234 of the sleeve 228. This edge 237 comprises one of the surfaces which coact to form the main relief valve.

A cylindrical, hollow, cup-shaped poppet or movable valve spool 239 is slidably received in sleeve 228. At its left or inner end 241 the spool 239 is provided with a conical or beveled external surface 242 which mates with and cooperates with edge 237 of sleeve 228 to form the main valve for controlling pressure. There is a restricted opening or orifice 244 through the inner end of the sleeve. Opening 244 provides restricted fluid communication through the end surface 241 of spool 239 between bore 227 and the fluid retaining or control pressure chamber 246 which is defined on the interior of the spool 239.

A compression spring 247 in chamber 246 bears against the inner end 241 of spool 239 and tends to hold the spool into sleeve 228. In the relief valve shown the cross-sectional area of spool 239 is preferably slightly greater, e.g., about 3 percent, than the internal area of the spool surface 241 located within the land 234 of sleeve 228.

A movable piston or poppet member generally designated by 269 is slidably received in bore 227 of sleeve 228. This piston or poppet member 269 has a cylindrical central portion 271 which forms a movable fluid seal with bore 227 in which it slides. The poppet 269 also has a tapered or inverted conical end portion 272 which rounds outwardly as at 273 where the portion 272 joins with the central portion 271 of poppet 269. The flared surface 273 reduces turbulence of flow between ports 251 and 252. The cross-sectional area of poppet 269 is preferably slightly less, e.g., by about 3 percent, than the internal area of the land 234 of sleeve 228, and is thus preferably about 6 percent smaller than the area 241 of spool 239. A small diameter neck portion 274 is formed at the opposite end of poppet 269, and a horizontal annular area 276 is defined between neck 274 and portion 271 of poppet 269. Both the inner end 277 and the outer end 278 of poppet 269 are flat and are fitted with identical O-rings 279 and 281 respectively. When the poppet 269 is forced inwardly in bore 227, the O-ring 279 in the inner end 277 of the poppet forms a valve or fluid seal with the bottom surface of bore 217, and when the poppet 269 is forced outwardly in bore 227, the O-ring 281 in the outer end 278 of the poppet 269 forms a valve or fluid seal with the inner end 241 of the spool 239.

An axial bore 283 extends through poppet 269 between the ends 277 and 278 thereof, and is provided with a restricted opening or orifice 286 formed in it. The O-rings 279 and 281 encircle the ends of bore 283. As will be explained, fluid pressure at port 251 is supplied to the inner end of poppet 269 and urges the poppet outwardly into facial engagement with the inner end 241 of spool 239, so that a fluid passageway is provided from the inner end of poppet 269 and port 251 into the control pressure chamber 246 above spool 239 through the passageways 283 and 244 which, under these circumstances, are sealingly connected end to end by the valve action of O-ring 281 and the bottom of spool 239. A horizontal bore 266 communicates annular groove 468 and the annular groove 262 of bore 217, by means of a restricted opening or orifice 284. An annular groove 229 in piston 269 alternately connects annular groove 468 or bore 462 to bore 264 depending on the operating position of movable piston or poppet 69.

To spring center the poppet 269, it has a snap ring 342 fixedly mounted within a slot near the inner end. Another snap ring 343 is fixedly mounted inside the sleeve 228 adjacent the inner end. A pair of spaced washers 340, 341 are slidably mounted over the small diameter end section 274 of the poppet on opposite sides of a compression spring 344 which biases the two apart. The spring 344, washers 340, 341, and snap rings 342, 343 assembly effects centering position of the poppet when there is equal pressure at the ports 251, 252 by causing the washer 340 to abut against surface 276 of the poppet and move it to the right as viewed in FIG. 2 until the snap ring 342 abuts against the other washer 341.

The cap structure 212 which is mounted upon the outer surface 215 of the body 211 contains a suitable pilot or control valve mechanism which directly controls the opening of the main valve 237, 242, and whereby the pressure at which the main valve opens can be adjusted. As herein shown, the cap 212 has a horizontal bore 291 formed through it, and a fixed pilot valve seat element 292 threaded into the end of the bore 291. Pilot valve seat element 292 has an axial bore 293 which opens through a restricted orifice 294 into the relief valve chamber 246.

A cone-shaped movable valve element 303 cooperates with the seat 292 to form a pilot valve which controls the maximum pressure in control pressure chamber 246. A compression spring 304 urges the movable element 303 into closing position with respect to the fixed valve element 292. The compression of spring 304 is adjusted by means of an adjusting mechanism which is designated generally by 306. The adjusting mechanism 306 includes an adjusting screw 307 the inner end of which bears against a plug 308 slidable in the bore 291 which carries an O-ring seal and which abuts the spring 304 and thereby determines the compression of that spring. A lock nut 409 secures screw 307 axially with respect to bore 291 in the cap structure 212. A pilot flow drain port 329 communicates with the bore 291 on the right or downstream side of valve element 303 and horizontal bore 309.

In operation, and assuming first that pump PV is pumping fluid in a clockwise direction through lines 193, motor MF and line 192 so that pressure is supplied to port 252 and port 251 is at low pressure with respect to port 252, port 252 under these circumstances comprises the inlet port of the valve 209. Fluid pressure at port 252 is applied to the lower end surface or area 241 of spool 239 through bores 463 and 227. Under static conditions (when the valve 237, 242 is closed), this same fluid pressure is reflected in chamber 246 above spool 239 through the restricted opening or orifice 244 in the lower end of spool 239. The pressure of fluid beneath spool 239 and at port 252 acts outwardly on an area equal to the cross-sectional internal area within the land 234 of the sleeve 228, whereas the pressure outside the spool 239 in chamber 246 acts downwardly on a slightly larger area which is equal to the cross-sectional area of spool 239. As previously explained, the cross-sectional area of the spool 239 is slightly greater, preferably about 3 percent, than the area within the land 234 of the sleeve 228. Therefore, under these circumstances, the downward acting fluid force is the greater, and together with the force of spring 247, holds the main valve 237, 242 closed.

The fluid pressure in control pressure chamber 246 is applied to the left end of movable pilot valve element 303 through restricted opening or orifice 294 and bore 293 in the fixed valve seat plug 292. Spring 304 holds the valve 292, 303 closed until the fluid force tending to open the pilot valve exceeds the force of spring 304.

When the fluid pressure at the inlet 252, as reflected on conical pilot valve element 303, applies a force to the valve element 303 which is greater than the force of spring 304, the pilot valve 292, 303 opens, permitting fluid under pressure in chamber 246 to flow to the pilot drain port 329 thus limiting the pressure in chamber 246 at that pressure at which valve 292, 303 opens.

If the spring 304 is adjusted to require 3,000 p.s.i. acting on poppet 303, then the pressure in control pressure chamber 246 will never more than slightly exceed 3,000 p.s.i. and this excess will be due solely to the pressure drop across the non-chatter orifice 294. Thus, whenever valve 292, 303 is open there will be a flow of fluid from the port 252 through the orifice 244, chamber 246, orifice 294 and valve 292, 303 to port 329. It will thus be seen that the resulting pressure drop across the orifice 244 will create a pressure differential at opposite ends of the spool 239 with the greater pressure tending to move the spool 239 thereby opening the valve 237, 242 in proportion to the pressure differential and limiting the pressure in port 252 to a value only slightly higher than that pressure at which valve 292, 303 opens.

As the main valve 237, 242 opens, fluid under pressure at the inner end of spool 239 is released to port 251. The compression of spring 304, which determines the fluid pressure required to open the pilot valve 292, 303, controls the pressure in inlet 252 at which the main valve 237, 242 will open, and as previously explained this operating pressure can be adjusted by means of the adjusting mechanism 306.

When the pressure of fluid at the inlet 252 drops to a value at which the fluid force acting on movable valve element 303 is less than the force of spring 304, the pilot valve 292, 303 will close, thereby preventing flow to the reservoir through port 329, and the fluid pressure in chamber 246 rapidly builds up to a pressure equal to that acting on the inner end of spool 239. The valve closing fluid pressure, together with the mechanical force of the spring 247, then closes the main valve 237, 242.

When the pressure at port 252 is greater than that at port 251, the poppet 269 is held inwardly in bore 227 by the pressure of fluid acting on its outer face surfaces 278, 273. Under these conditions, where port 251 is the inlet port, the pressure on annular area 278 will be equal to the pressure of fluid at the inlet. Therefore, the larger inwardly acting pressure holds the poppet 269 against the inner end of bore 227, and fluid is prevented from flowing through bore 283 to the chamber 255 by the valve means including O-ring 279 which forms a seal at the inner end of the poppet 269. FIG. 2 shows the poppet 269 in this position when pressure at port 252 is greater than that at port 251.

When the poppet valve 269 is in the innermost position illustrated in FIG. 2, makeup or boost fluid is supplied from the pump PF through line 196, filter 197, line 198 and check valve 194 to the low pressure line 192. High pressure in line 193 maintains the check valve 195 closed. The low pressure safety valve 203 is also closed so that the full flow from booster pump PF is pumped into the low pressure or pump PV inlet line. Fluid motor exhaust and excess boost pump flow is bled off from the closed loop circuit from the low pressure line 192 at a point upstream of the line 198 through line 322 and through the combination relief and shuttle valve 209. Flow through the valve 209 is from port 251 through groove 233, channel 222, groove 262, ports 469, 470, grooves 468 and 329 to channel 465, port 466 and channel 263 to the conduits 264 and 309. From the channel 309 excess boost pump volume and fluid motor exhaust volume is passed through line 200, low pressure check valve 201 and motor casing of motor MF back to the reservoir RE through line 202 and the heat exchanger HE. It should be noted that the boost pump PF supplies all the volume needed by the pump inlet port with a full flow of fresh fluid from the reservoir. This flow enters line 192 at a point closer to the pump than the connection of branch line 322. The relative locations of the points where lines 198 and 322 connect into line 192 and the capacity of the booster pump PF assures that the hotter fluid exhausted by the motor or by the relief valve are returned to the reservoir through the heat exchanger HE, and only fresh fluid from the reservoir enters the pump inlet.

Assuming now that the pump PV is reversed so that flow is counterclockwise as viewed in FIG. 2, the line 192 is the high pressure line and the pressure at port 251 is greater than that at port 252. Port 251 then comprises the inlet port of the valve 209. Pressure at port 251 is applied through groove 233, passage 222, groove 262, ports 469, 470, groove 468, through orifice 284, and bore 266 to the annular area 276 around the neck 274 at the lower end of poppet 269. Since the pressure at port 252 is relatively low, the pressure on the described annular area 276 shifts the poppet 269 outwardly in bore 227 and holds its outer end 278 in facial sealing engagement with inner end 241 of spool 239. The O-ring 281 forms a fluid seal between the outer surface 278 of poppet 269 and the inner end 241 of the spool 239, so that a direct fluid passageway is provided between chamber 255 of bore 227 to chamber 246 through bore 283 and restricted opening or orifice 244. Through these connecting passageways pressure in inlet 251 is applied to chamber 246 and pilot valve element 303, and it is this pressure in conjunction with the pressure at port 251 acting on the inner end of piston 269 which then controls the operation of the pilot valve.

The pressure of fluid in chamber 246 acts inwardly on the cross-sectional area of the spool 239, whereas the pressure of fluid acting outwardly on the inner end of the poppet 269 acts on a cross-sectional area which is preferably about 6 percent smaller, as previously explained, then the cross-sectional area of spool 239, but this area when added to the 3 percent at the edge 242 leaves a total 3% difference in effective hydraulic unbalance on the spool 239, and therefore a net inward force holds the spool 239 inwardly to maintain the valve 237, 242 closed until the pressure in chamber 246 is released. (Thus, regardless of whether port 251 or port 252 is the inlet or high pressure port, hydraulic and spring pressure holds the main valve 237, 242 closed until the pilot valve 292, 303 opens and the force of spring 247 is overcome). The pressure at inlet 251 will be maintained at the value determined by the compression of spring 304, and this pressure will continue to hold the poppet 269 against the spool 239. When the pressure at the inlet 251 drops below the value maintained by spring 304, the pilot valve 292, 303 closes, the pressure in chamber 246 builds up to a value equal to the pressure at port 251 and supplies a force which with the spring 247 then overcomes the outward force applied to the poppet 269, and closes the valve 237, 242. Fluid pressure at the lower end of poppet 69 holds the poppet in contact with the inner end 241 of the spool 239 so long as this pressure is greater than the pressure in port 252.

With the poppet 269 in this outermost position, full boost pump volume is inserted into the low pressure line 193 via line 199 and circulated through the fluid pump PV and fluid motor MF via line 192 and then removed from the closed loop circuit through line 323 and the valve 209. The flow of fluid motor exhaust oil through the valve 209 is then via port 252, chamber 453, groove 229 of poppet valve 269, ports 466, 467, groove 263, and channel 264 to port 309. From port 309, the exhaust flow is through line 200 and check valve 201 to the case of the motor MF and subsequently back to the reservoir RE.

From the foregoing it will be seen that regardless of the direction of fluid flow through the dual relief and shuttle valve, it is the pilot valve 292, 303 which controls the operation of the pressure relief valve 237, 242. In the first circumstance described, however, the pressure applied to the pilot valve is controlled by pressure at inlet 252, whereas in the other situation the pressure at port 251 is applied to the pilot valve to operate it. In effect, the piston or poppet 269, which when the port 251 is the high pressure port is operative in actuating the spool 239, also comprises a valve which connects the appropriate port 251 or 252, whichever is under the greater pressure, to supply the operating pressure to the pilot valve, and the pilot valve is thus operated by whichever pressure at the ports 251, 252 is the greater. Simultaneously the poppet 269 also acts to connect whichever port 251, 252 is the lower pressure port to the exhaust fluid port 309.

As has been described, poppet or shuttle valve 269 has been designed to automatically shift to either one of two positions in response to whichever port 251 or 252 has the higher pressure, and in turn connect the other, or lower pressure port to exhaust. In the event that an external shaft load on the motor MF tries to turn the fluid motor faster than it is driven by the pump, neither line 192 or 193 or ports 251 or 252 would necessarily carry any substantial pressure. Without the centering spring 344, the fluid motor MF exhaust would then stay connected to exhaust line 200, and the fluid motor would free wheel, or pick up speed, and no longer be under control of the pump displacement setting. However, in such a case — with little or no pressure in both lines 192 and 193 — the spring 344 positions poppet or shuttle valve 269 in a position to block the exhaust fluid from the motor from continuing to be bypassed to the reservoir. The exhaust from the motor may then only be absorbed by the pump inlet, and the motor speed is still controlled by the pump displacement.

As in the embodiment of FIG. 1, the pressure relief valve 209 also has a fourth port 431 which is always connected by the poppet 269 to the high pressure port 251, 252 of the valve 209. This port 431 opens into and is always in communication with the conduit 283 internally of the poppet 269. In the inner position of the poppet 269, when the port 252 is connected to the high pressure side of the pump PV, the port 431 is connected to the port 252 through the conduit 283, the orifice 286, and the chambers 227 and 453. In the outer position of poppet 269, the port 251 is the high pressure port and the connection is via conduits 222, channels 262 and 468, orifice 284, channel 266 and chamber 255 to the port 431.

The high pressure port 431 is connected to the servo system via line 332 so that the high pressure may be utilized to actuate the servo motors and position the displacement changing element, such as the hanger (not shown), of the pump PV.

The modification of FIG. 2 has been described hereinabove as a full boost transmission, i.e., one in which the entire exhaust flow of the motor MF is directed to the reservoir via lines 192, 322 and the shuttle valve. When operated as a full boost transmission, all of the pump PV intake fluid is supplied from the reservoir by the boost pump PF. The capacity of the boost pump must then be large enough to supply the full volumetric requirement of the pump PV inlet as well as makeup or replenishment fluid for closed loop leakage and fluid losses.

This FIG. 2 modification also has utility as a partial boost transmission. When used as a partial boost system, the boost pump PF only supplies a portion of the fluid to the pump inlet, the remainder being directed from the motor MF via line 192 to the pump inlet. For example, the boost pump PF capacity might be 20 percent of the volumetric requirement of the pump inlet. In that case, the circuit of FIG. 2 would operate in exactly the same manner as described hereinabove when used as a full boost system except that 20 percent of the intake fluid to the pump PV would be supplied via line 194 or 195 and the other 80% would be supplied from the exhaust side of the motor MF so long as the relief valve 237, 242 remains closed. When the relief valve opens in the partial boost mode of operation of the system, 20 percent of the intake fluid to the pump still is supplied via line 194 or 195 but the other 80 percent is then supplied from the high pressure line 194 or 195 through the relief valve and line 322 bypassing the motor. In that case, when the relief valve is closed, approximately 20 percent of the exhaust fluid of motor MF would then flow via line 322 and the shuttle valve back to the reservoir through the heat exchanger. Necessarily, when the FIG. 2 circuit is used as a partial boost system, it has much less cooling capacity than when used as a full boost system. However, in applications where fluid heat dissipation is not such a problem, a partial boost system may be preferable.

While we have described only two preferred embodiments of our invention, those persons skilled in the arts to which this invention pertains will readily appreciate numerous changes and modifications which may be made without departing from the spirit of our invention. Therefore, we intend to be limited only by the scope of the appended claims.

Having described our invention, we claim:

1. A combination dual relief and shuttle valve, said valve having at least three outlet ports, the first and second of said ports being adapted to be connected to a pair of differential pressure fluid lines, a movable pressure relief valve element cooperable with a valve seat in said valve to control the flow of fluid between said first and second ports, means forming a control pressure chamber, the pressure in said chamber acting to urge said pressure relief valve element in a first direction, a movable differential pressure operated piston having opposite surfaces disposed to be acted upon respectively by the fluid pressures at said first and second ports, first valve means operated by said movable piston for connecting said control chamber with whichever of said first and second ports contains the higher pressure while isolating said control chamber from that one of said first and second ports which contains the lower pressure, and second valve means operated by said piston for connecting whichever of said first and second ports contains the lower pressure to said third outlet port.

2. A combination dual relief and shuttle valve, said valve having at least three outlet ports, the first and second of said ports being adapted to be connected to a pair of differential pressure fluid lines, a movable pressure relief valve element cooperable with a valve seat in said valve to control the flow of fluid between said first and second ports, means forming a control pressure chamber, the pressure in said chamber acting to urge said pressure relief valve element in a thirst direction, means presenting a surface subjected to fluid pressure at said first port for urging said movable valve element in an opposite direction, orifice means through which fluid must flow to enter said control chamber, pilot valve means for controlling the maximum pressure in said control chamber, a movable differential pressure operated piston having opposite surfaces disposed to be acted upon respectively by the fluid pressures at said first and second ports and arranged to cooperate with said surface presenting means for urging said movable valve element in said opposite direction when the pressure at said second port is greater than the pressure at said first port, first valve means operated by said movable piston for connecting said orifice means with whichever of said first and second ports contains the higher pressure while isolating said orifice means from that one of said first and second ports which contains the lower pressure, and second valve means operated by said piston for connecting whichever of said first and second ports contains the lower pressure to said third outlet port.

3. The combination dual relief and shuttle valve of claim 2 in which said movable differential pressure operated piston is engageable with said surface presenting means when the pressure at said second port is greater than the pressure at said first port, and in which said orifice means extends through said surface presenting means.

4. A dual relief valve including a body and means located within the body forming a valve between a first and second outlet port in said body, said valve means including a generally cup-shaped axially movable element, the axial position of which controls the flow of fluid between said ports, means forming a control pressure chamber within said cup-shaped element, the pressure in which acts to urge said movable element in one axial direction, a surface on the opposite side of said cup-shaped element from said chamber adapted to be subjected to fluid pressure at said first port for urging said movable element in the opposite axial direction, orifice means extending axially through said movable element through which fluid must flow to enter said control pressure chamber, pilot valve means including an axially movable valve element for controlling the maximum pressure in said control chamber, said pilot valve means being at least partially located within said cup-shaped valve element, said pilot valve being in axial alignment with said cup-shaped element, and a movable differential pressure operated piston means located internally of said body, said piston means being in axial alignment with said cup-shaped element and movable axially with respect to said movable element and having opposite surfaces disposed to be acted upon respectively by the fluid pressures at said first and second ports, one of said opposite surfaces of said piston means being arranged to cooperate with said surface of said movable element for urging said movable valve element in said opposite direction in response to pressure at said second port when the pressure at said second port is greater than the pressure at said first port, and valve means operated by said movable piston means for connecting said orifice means with whichever of said ports contains the higher pressure while isolating said orifice means from that port which contains the lower pressure.

5. The dual relief valve of claim 4 in which said body contains a third outlet port and second valve means operated by said movable piston means for connecting whichever of said first and second ports contains the lower pressure to said third outlet port.

6. A combination dual relief and shuttle valve which includes a valve body, having at least three outlet ports therein, the first and second of said ports being adapted to be connected to a pair of differential pressure fluid lines, an axially movable valve element located within said body and axially movable to control the flow of fluid between said first and second ports, means forming a pressure control chamber, the pressure in which acts to urge said movable element in one axial direction, said movable element having a surface adapted to be subjected to fluid pressure at said first port for urging said movable element in the opposite axial direction, orifice means extending axially through said movable element through which fluid must flow to enter said control pressure chamber, pilot valve means for controlling the maximum pressure in said control chamber, a movable differential pressure operated piston, said piston means being movable axially with respect to said movable element and having opposite surfaces disposed to be acted upon respectively by the fluid pressures at said first and second ports, one of said opposite surfaces of said piston means being arranged to cooperate with said surface of said movable element for urging said movable valve element in said opposite direction in response to pressure at said second port when the pressure at said second port is greater than the pressure at said first port, valve means operated by said movable piston means for connecting said orifice means with whichever of said ports contains the higher pressure while isolating said orifice means from that port which contains the lower pressure, and second valve means operated by said piston for connecting whichever of said first and second ports contains the lower pressure to said third outlet port.

7. The combination dual relief and shuttle valve of claim 6 wherein the first valve means operated by said movable piston means includes a fluid flow restricting passageway between the end surfaces of said piston means, and resilient sealing means mounted in the opposite end of said piston means and surrounding said passageway.

8. The combination dual relief and shuttle valve of claim 6 in which said second valve means operated by said piston means comprises at least one land in the peripheral surface of said piston means and a cooperating land in the body of said valve, said cooperating land being connected to said third port of said body.

* * * * *